United States Patent
Yamamoto

(10) Patent No.: US 7,619,955 B2
(45) Date of Patent: Nov. 17, 2009

(54) OPTICAL RECORDING MEDIUM RECORDING APPARATUS

(75) Inventor: Takuya Yamamoto, Fukuoka (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 11/657,053

(22) Filed: Jan. 24, 2007

(65) Prior Publication Data
US 2007/0171795 A1 Jul. 26, 2007

(30) Foreign Application Priority Data
Jan. 25, 2006 (JP) ............... 2006-015867

(51) Int. Cl.
*G11B 15/52* (2006.01)

(52) U.S. Cl. ............... 369/47.53; 369/53.27

(58) Field of Classification Search ............ None
See application file for complete search history.

(56) References Cited

U.S. PATENT DOCUMENTS

2004/0027949 A1* 2/2004 Matsuura et al. ......... 369/47.51

FOREIGN PATENT DOCUMENTS

| JP | 2003-228832 A | 8/2003 |
| JP | 2003-242649 A | 8/2003 |
| JP | 2003-281720 A | 10/2003 |
| JP | 2004-234812 | 8/2004 |
| JP | 2004-234812 A | 8/2004 |

OTHER PUBLICATIONS

Japanese Office Action for application No. 2006-015867 dated Jan. 20, 2009.

* cited by examiner

*Primary Examiner*—Paul Huber
(74) *Attorney, Agent, or Firm*—Rader, Fishman & Grauer PLLC

(57) ABSTRACT

Disclosed herein is an optical recording medium recording apparatus, includes: an optical pickup section configured to irradiate laser light on an optical recording medium to perform recording or reproduction of information on or from the optical recording medium; a control section configured to control the optical pickup section; and a storage section configured to store in advance an evaluation function for adjusting the intensity of the laser light in response to reflected light of the laser light when information is to be recorded on the optical recording medium; wherein the control section being operable to interrupt a recording process of information onto the optical recording medium midway of the recording process and reproduce information recorded before the interruption and then adjust the evaluation function based on a detection result of reflected light upon the reproduction.

6 Claims, 7 Drawing Sheets

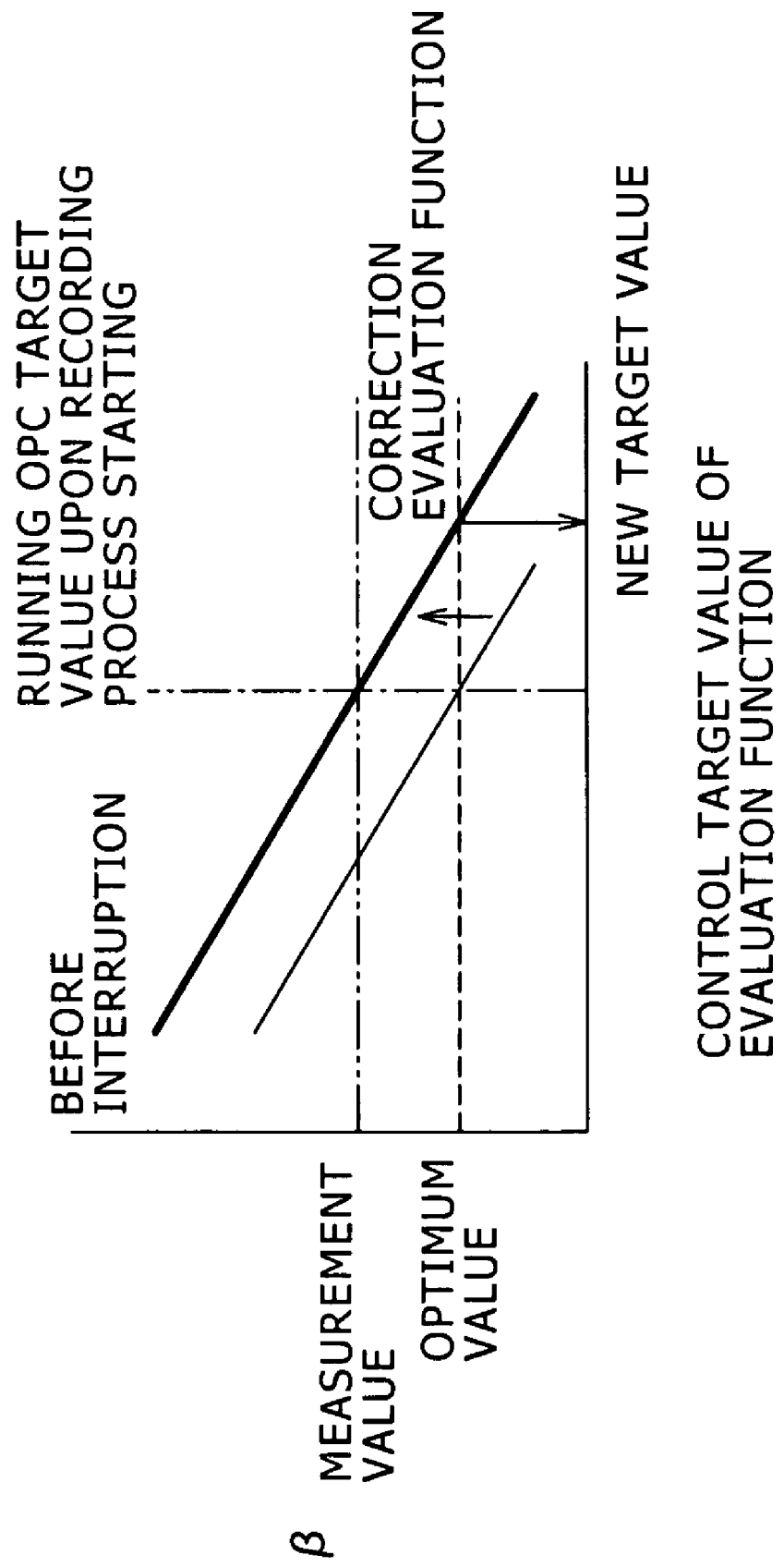

OPTICAL RECORDING MEDIUM RECORDING APPARATUS

CROSS REFERENCES TO RELATED APPLICATIONS

The present invention contains subject matter related to Japanese Patent Application JP 2006-015867 filed in the Japanese Patent Office on Jan. 25, 2006, the entire contents of which being incorporated herein by reference.

BACKGROUND OF THE INVENTION

1. Field of the Invention

This invention relates to an optical recording medium recording apparatus, and more particularly to an optical recording medium recording apparatus wherein an evaluation function which is used as an index to intensity adjustment of laser light when the laser light is irradiated to record information on an optical recording medium is adjusted in response to reflected light of the laser light.

2. Description of the Related Art

Various types of optical recording media such as optical disk on which digital information can be recorded are known in related art.

Particularly as write-once optical recording media which are formed using an organic coloring matter and on which digital information can be recorded once, a CD-R (Compact Disk Recordable), a DVD+R, a DVD-R (Digital Versatile Disk Recordable) and so forth are known. Meanwhile, as erasable type optical recording media which are formed using a phase-change type material and on which data can be rewritten, a CD-RW (Compact Disk ReWritable), a DVD-RW (Digital Versatile Disk ReWritable), a DVD-RAM (Digital Versatile Disk Random Access Memory), a BD-RE (Blu-ray Disk ReWritable) and so forth are known.

Although such optical recording media are usually fabricated on a production line which is managed strictly, a dispersion sometimes occurs with a coloring matter component or an alloy component from a difference among fabrication methods of different manufacturers or a dispersion between production lots.

Particularly a write-once optical recording medium formed using an organic coloring matter sometimes suffers from warping or surface deflection or the state of such warping or surface deflection sometimes changes depending upon the fabrication procedure or the use state or the storage state of the user. It is to be noted that the warping of the optical recording medium is a state wherein the optical recording medium is deformed like an open umbrella. Meanwhile, the surface deflection of the optical recording medium is a state that, when the optical recording medium is rotated, the recording face thereof is deflected laterally like undulations in response to the rotational angle.

If a dispersion of a coloring matter or an alloy component of a recording layer or an optical recording medium or warping or surface deflection of an optical recording medium occurs in this manner, then even if the manufacturer and the model of the optical recording medium are same, the recorded state of information on the recording face of the optical recording medium becomes different. Accordingly, upon reproduction of the information, fixed quality of the reproduction signal is not usually obtained, resulting in difficulty in decoding of the data.

Thus, as a method of adjusting the intensity of laser light to be used for recording on an optical recording medium in order that the quality of the reproduction signal may be kept fixed, various control methods are known including OPC (Optimum Power Calibration) and running OPC.

According to the OPC, before data are recorded, laser light of a predetermined pattern is irradiated upon a PCA (Power Calibration Area), which is a trial writing region of an optical recording medium, to perform trial writing. Then, the data written in this manner are reproduced and an optimum intensity of laser light is determined in accordance with a certain evaluation reference to enhance the recording quality.

Meanwhile, according to the running OPC, when laser light for recording is irradiated upon an optical recording medium to record required information, reflected light of the laser light is detected, and the intensity of the laser light to be irradiate is corrected in response the detected intensity of the reflected light.

The OPC and the running OPC are used such that, upon starting of recording of information on an optical recording medium, the OPC in the PCA of the optical recording medium is executed once and recording of information on the optical recording medium is started with the intensity of the laser light determined by the OPC. Thereafter, the intensity of the laser light is adjusted to an appropriate state by the running OPC.

It is to be noted that an optical recording medium is likely to suffer from a dispersion at inner and outer circumferential portions thereof in formation of a recording medium in a fabrication process, and the optimum intensity of laser light often differs along a diametrical direction of an optical recording medium.

In order to reflect such appropriate variation of the intensity of laser light at inner and outer circumferential portions of an optical recording medium, when the running OPC is performed, an evaluation function is used.

The evaluation function is represented by a characteristic curve which represents the depth information of a pit with respect to the intensity of laser light. In the running OPC, the intensity of laser light is adjusted based on the characteristic curve so that information can be written with high quality on the optical recording medium.

It is to be noted that, although, in the running OPC, reflected light of laser light upon recording of information on an optical recording medium with the laser light is detected to perform intensity adjustment of the laser light, since the reflected light detected is different from reflected light upon reading out of the recorded information, there is the possibility that the reflected light may not reflect the recorded state correctly.

Thus, also such a countermeasure as described just below is available recently so that a recording process can be executed using laser light of a more appropriate intensity. In particular, a recording process of information on an optical recording medium is interrupted while it is proceeding, and information recorded before such interruption is reproduced and intensity adjustment of the laser light is performed based on a result of detection of reflected light upon reproduction to reproduce the recording process. A method of the type described is disclosed, for example, in Japanese Patent Laid-Open No. 2004-234812.

SUMMARY OF THE INVENTION

However, even if a recording process of information on an optical recording medium is interrupted and is then re-started using laser light of the adjusted intensity, since the running OPC involves intensity adjustment of the laser light based on reflected light of laser light for recording, there is the possibility that the intensity of the laser light may be displaced from the appropriate intensity by the correction by the running OPC after the re-starting. Therefore, there is the possibility that the processing time of the recording process may become very long if interruption of the recording process, re-adjustment of the laser light and re-starting of the recording process are repeated frequently.

However, since the appropriate evaluation function for use with the running OPC differs depending upon the type of the optical recording medium to be used, it is preferable to prepare an appropriate function for each type of the optical recording medium. However, the prepared evaluation function may not appropriate for the optical recording medium because of a fabrication dispersion of the optical recording medium.

Therefore, it is desirable to provide an optical recording medium recording apparatus by which a recording process can be executed while an appropriate laser intensity is maintained as long as possible.

According to an embodiment of the present invention, there is provided an optical recording medium recording apparatus includes an optical pickup section configured to irradiate laser light on an optical recording medium to perform recording or reproduction of information on or from the optical recording medium, a control section configured to control the optical pickup section, and a storage section configured to store in advance an evaluation function for adjusting the intensity of the laser light in response to reflected light of the laser light when information is to be recorded on the optical recording medium, the control section being operable to interrupt a recording process of information onto the optical recording medium midway of the recording process and reproduce information recorded before the interruption and then adjust the evaluation function based on a detection result of reflected light upon the reproduction.

In the optical recording medium recording apparatus, a recording process of information onto the optical recording medium is interrupted midway of the recording process, and information recorded before the interruption is reproduced. Thereafter, the evaluation function is adjusted based on a detection result of reflected light upon the reproduction. Consequently, after the recording process is resumed, the intensity of the laser light can be adjusted based on an appropriate evaluation function, and a stabilized recording process of high quality can be achieved over the overall area of the optical recording medium.

The optical recording medium recording apparatus may be configured such that a plurality of evaluation functions are stored in advance in the storage section, and the control section adjusts the evaluation function by selecting one of the evaluation values based on the detection result of the reflected light upon the reproduction.

In the optical recording medium recording apparatus, since a plurality of evaluation functions are stored in advance and the evaluation function is adjusted by selecting one of the stored evaluation values based on the detection result of the reflected light upon the reproduction. Therefore, even if the optical recording medium has some fabrication dispersion, an appropriate evaluation function can be used in response to the dispersion.

In this instance, the optical recording medium recording may be configured such that, before the recording process of the information on the optical recording medium is performed, the control section causes a plurality of test data to be recorded in a trial writing region provided on the optical recording medium while changing the intensity of the laser light and evaluates a recorded state using a predetermined one of the evaluation functions stored in the storage section irrespective of the type of the optical recording medium, and decides the intensity of the laser light when the recording process of the information on the optical recording medium is performed based on a detection result of reflected light upon reproduction of the test data.

In the optical recording medium recording apparatus, before the recording process of the information on the optical recording medium is performed, a plurality of test data are recorded in a trial writing region provided on the optical recording medium while changing the intensity of the laser light. Then, a recorded state is evaluated using a predetermined one of the evaluation functions stored in the storage section irrespective of the type of the optical recording medium. Thereafter, the intensity of the laser light when the recording process of the information on the optical recording medium is performed is determined based on a detection result of reflected light upon reproduction of the test data. Therefore, an appropriate intensity of the laser light can be specified efficiently making use of the trial writing region of the optical recording medium.

Alternatively, the optical recording medium recording apparatus may be configured such that, before the recording process of the information on the optical recording medium is performed, the control section causes a plurality of test data to be recorded in a trial writing region provided on the optical recording medium while changing the intensity of the laser light and evaluates a recording state using an evaluation function corresponding to the type of the optical recording medium from among predetermined evaluation functions stored in the storage section, and decides the intensity of the laser light when the recording process of the information on the optical recording medium is performed based on a detection result of reflected light upon reproduction of the test data.

In the optical recording medium recording apparatus, before the recording process of the information on the optical recording medium is performed, a plurality of test data are recorded in a trial writing region provided on the optical recording medium while changing the intensity of the laser light. Then, a recording state is evaluated using an evaluation function corresponding to the type of the optical recording medium from among predetermined evaluation functions stored in the storage section. Thereafter, the intensity of the laser light when the recording process of the information on the optical recording medium is performed is determined based on a detection result of reflected light upon reproduction of the test data. Therefore, an appropriate intensity of the laser light can be specified efficiently making use of the trial writing region of the optical recording medium.

The control section may adjust the evaluation function by producing a correction evaluation function obtained by correcting the evaluation function by means of parallel movement of the evaluation function or like means based on the detection result of the reflected light upon reproduction.

In the optical recording medium recording apparatus, the evaluation function is adjusted by producing a correction evaluation function obtained by correcting the evaluation function by means of parallel movement of the evaluation function or like means based on the detection result of the reflected light upon reproduction. Therefore, the number of evaluation functions to be prepared in advance can be minimized. Consequently, reduction of the storage capacity of the storage section can be achieved and enhancement of the efficiency in control by the control section can be anticipated.

The control section may interrupt the recording process when the intensity of the laser light exceeds a predetermined range corresponding to the intensity of the laser light at a point of time at which recording of information on the optical recording medium is started by adjusting the intensity of the laser light based on the evaluation function.

In the optical recording medium recording apparatus, the recording process is interrupted when the intensity of the laser light exceeds a predetermined range corresponding to the intensity of the laser light at a point of time at which recording of information on the optical recording medium is started by adjusting the intensity of the laser light based on the evaluation function. Therefore, the recording process can be interrupted only when such interruption becomes required. Consequently, the number of times of interruption can be minimized and the recording process can be performed with a high efficiency.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a diagram illustrating an evaluation function adjustment method where a single evaluation value is used in the optical recording medium recording apparatus.

DETAILED DESCRIPTION OF THE PREFERRED EMBODIMENTS

An optical recording medium recording apparatus according to the present invention includes an optical pickup section configured to irradiate laser light on an optical recording medium to perform recording or reproduction of information on or from the optical recording medium, a control section configured to control the optical pickup section, and a storage section configured to store in advance an evaluation function for adjusting the intensity of the laser light in response to reflected light of the laser light when information is to be recorded on the optical recording medium. In the optical recording medium recording apparatus, the control section interrupts a recording process of information onto the optical recording medium midway of the recording process, and reproduces information recorded before the interruption and then adjusts the evaluation function based on a detection result of reflected light upon the reproduction.

In short, the evaluation function to be used for the running OPC is adjusted based on a recording state upon recording process. Then, when the recording process is resumed, intensity adjustment of the laser light can be performed based on an appropriate evaluation function. Consequently, a stabilized recording process of high quality can be executed. Particularly since the evaluation function is adjusted, the recording process of high quality can be executed over the overall area of the optical recording medium.

Figure 1:
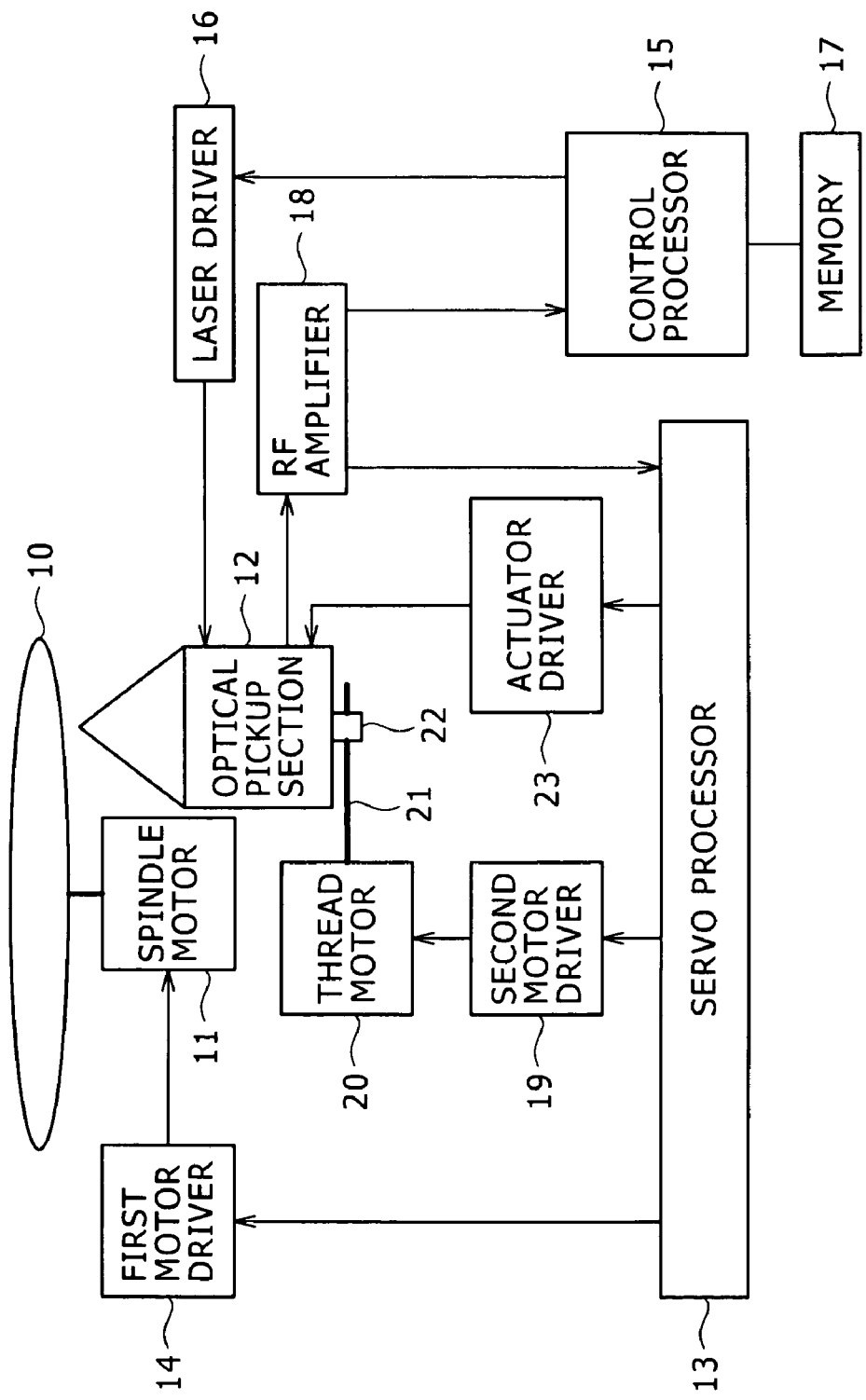
FIG. 1 is a block diagram of an optical recording medium recording apparatus according to an embodiment of the present invention.

In the following, a preferred embodiment of the present invention is described. FIG. 1 shows an optical recording medium recording apparatus which includes an optical recording medium recording circuit to which the present invention is applied.

Referring to FIG. 1, the optical recording medium recording apparatus includes a spindle motor 11 for driving an optical recording medium 10 to rotate, and an optical pickup section 12 for irradiating laser light upon the optical recording medium 10 being rotated by the spindle motor 11 and receiving reflected light of the irradiated light from the optical recording medium 10.

The spindle motor 11 is driven by a first motor driver 14 which is controlled by a servo processor 13.

The optical pickup section 12 includes a laser diode not shown for irradiating laser light on a recording face of the optical recording medium 10, and a plurality of light receiving elements not shown for receiving reflected light of the laser light. The laser diode is controlled by a laser driver 16 which is controlled by a control processor 15 serving as a control section to irradiate laser light of a required intensity.

A memory 17 serving as a storage section which stores a required evaluation function is connected to the control processor 15 such that the control processor 15 performs intensity control of the laser light based on the evaluation function stored in the memory 17.

The light receiving elements receive reflected light of the laser light irradiated upon the recording face of the optical recording medium 10 and output RF (Radio Frequency) signals. The outputted RF signals are inputted to and amplified by an RF amplifier 18 and inputted to the control processor 15 and the servo processor 13.

The optical pickup section 12 controls a thread motor 20 through a second motor driver 19 controlled by the servo processor 13 so that the optical pickup section 12 is moved back and forth in a diametrical direction of the optical recording medium 10 by the thread motor 20. In particular, the optical pickup section 12 is connected to a screw bar 21 connected for interlocking movement to an output shaft of the thread motor 20 through a threaded member 22 such that the optical pickup section 12 is moved back and forth along the screw bar 21 by rotation of the screw bar 21 by the thread motor 20.

Further, the optical pickup section 12 can be adjusted by an actuator driver 23 controlled by the servo processor 13 so as to adjust the distance thereof to the optical recording medium 10.

Figure 2:
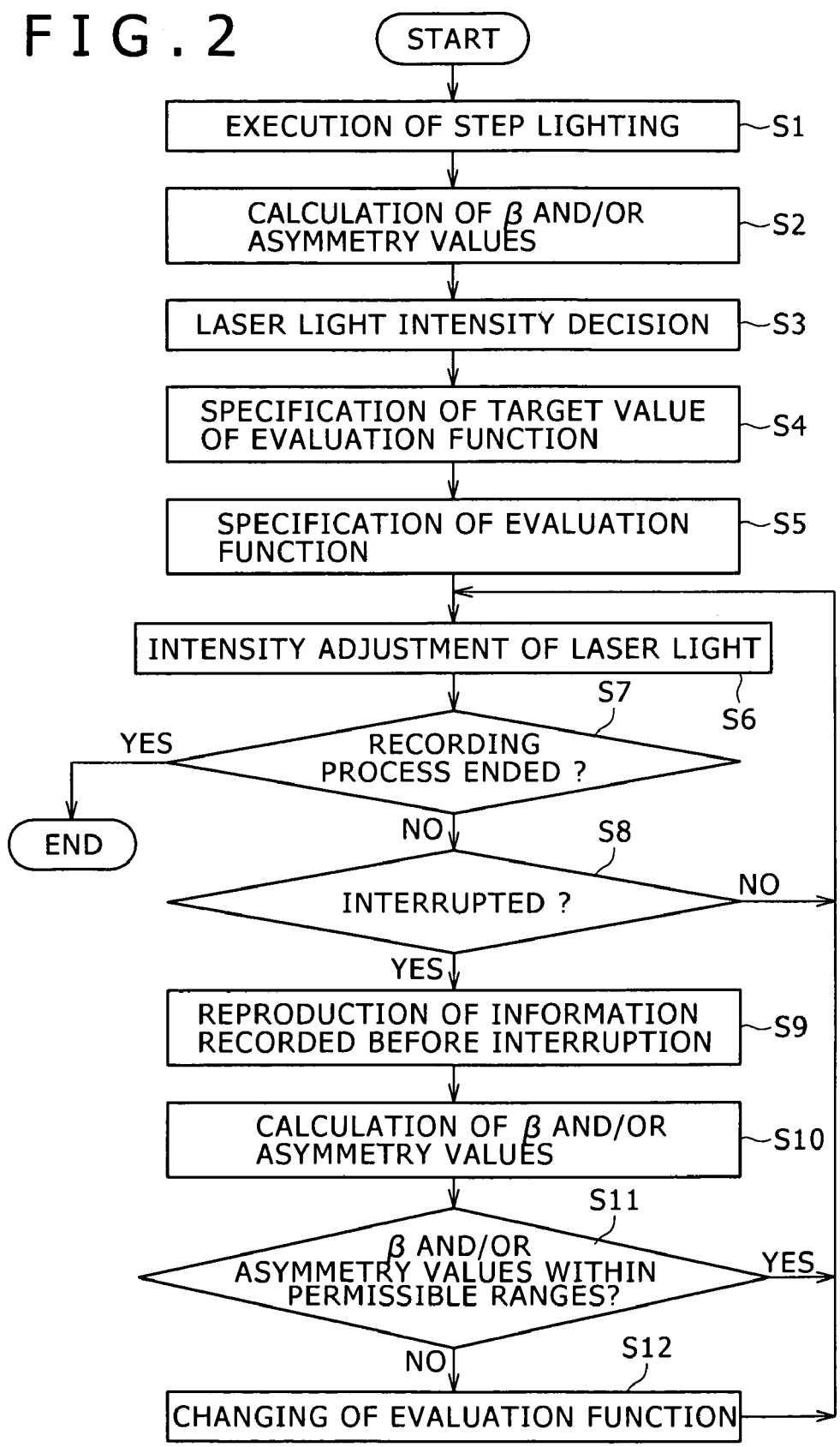
FIG. 2 is a flow chart illustrating a control procedure of a controlling processor of the optical recording medium recording circuit of the optical recording medium recording apparatus where a plurality of evaluation functions are available.

The control processor 15 serving as a control section of the optical recording medium recording apparatus configured in such a manner as described above performs a recording process of information on an optical recording medium while executing running OPC based on a flow chart illustrated in FIG. 2. It is assumed here that the memory 17 serving as a storage section has a plurality of evaluation functions stored therein. Further, interruption of the recording process is performed at a predetermined timing set in advance by the control section.

First, the optical recording medium recording apparatus executes OPC (Optimum Power Calibration) upon starting of recording of required information on an optical recording medium.

In the OPC, step writing in the PCA (Power Calibration Area) which is a trial writing region of the optical recording medium 10 is performed (step S1). The step writing is a recording process of outputting test data of a predetermined pattern from the control processor 15 and varying the intensity of the laser light to be outputted at fixed intervals for every fixed period of time to perform writing into the PCA.

The PCA is usually provided in both of an innermost circumferential portion and an outermost circumferential portion of the optical recording medium 10. The innermost circumferential portion and the outermost circumferential portion of the optical recording medium 10 are used to acquire data based on various evaluation functions to be used in running OPC during the step writing.

After the recording process by the step writing ends, the control processor 15 reproduces the test data written in the individual conditions and calculates $\beta$ and/or symmetry values from the reproduction signal (step S2).

Figure 3:
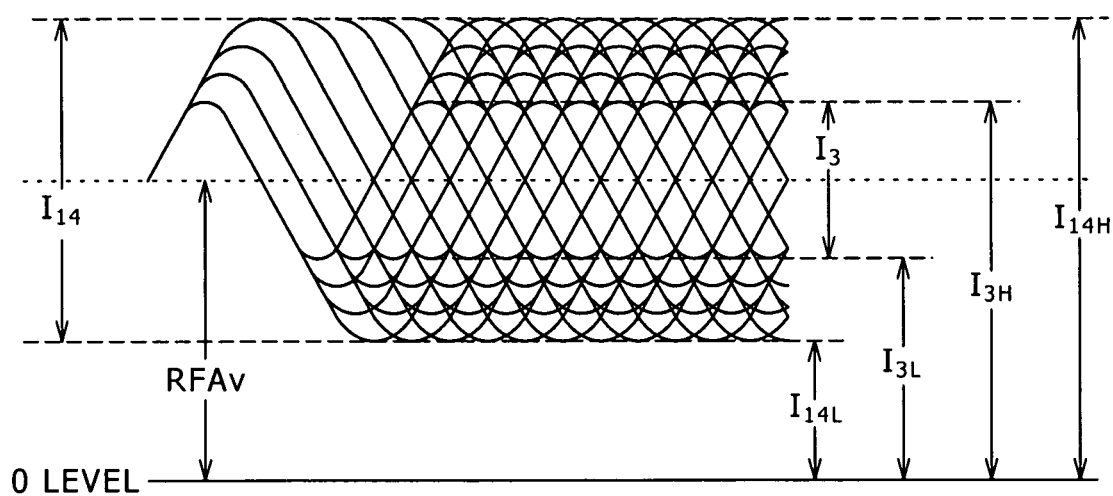
FIG. 3 is a diagram illustrating β and asymmetry values used in the optical recording medium recording apparatus.

The $\beta$ and symmetry values represent displacement amounts of the amplitude symmetry of the reproduction signal and are represented, using waveforms of the RF signal outputted from the optical pickup section 12 as a result of reproduction of the optical recording medium 10 as seen in FIG. 3, by the following expressions:

$$\text{asymmetry value} = [(I_{14H} + I_{14L})/2 - (I_{3H} + I_{3L})/2]/I_{14}$$

$$\beta = [(RFAv - I_{14L})/2 - (I_{14H} + RFAv)/2]/I_{14}$$

The control processor 15 specifies the intensity of the laser light with which an optimum recording state is obtained from the calculated $\beta$ and/or asymmetry values (step S3). Then, the control processor 15 specifies target values for the individual evaluation functions with which laser light of the specified intensity can be outputted (step S4).

Figures 4A, 4B:
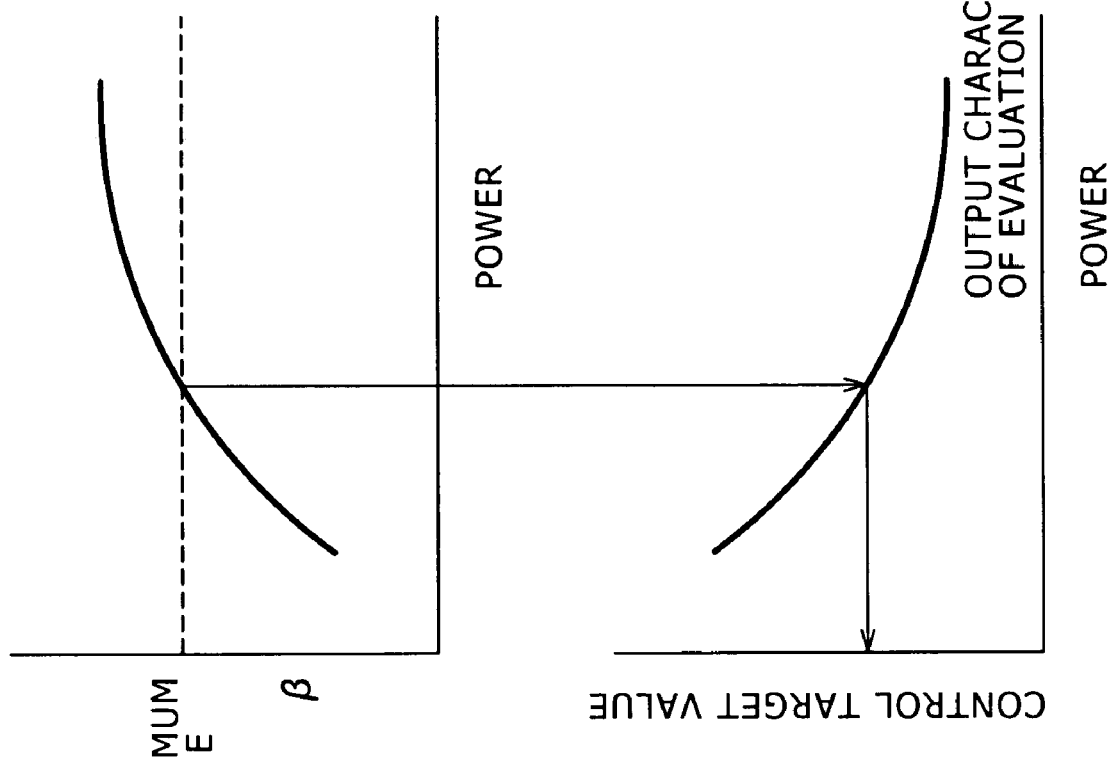
FIGS. 4A and 4B are diagrams illustrating a controlling target value determination method of an evaluation function.

The specification of a target value in an evaluation function is specification of the intensity of laser light with which an optimum $\beta$ value is obtained on a $\beta$ curve obtained by plotting the value of $\beta$ at different intensities (powers) of the laser light as seen in FIG. 4A. The specification further specifies a control target value with which laser light of the specified intensity can be outputted from an output characteristic curve of the evaluation function illustrated in FIG. 4B with respect to the control target value.

Further, the control processor 15 specifies the most appropriate evaluation function based on the calculated $\beta$ and/or asymmetry values and the specified intensities of laser light (step S5).

In the present embodiment, specification of the intensity of laser light and specification of an evaluation function are performed with regard to each of a plurality of evaluation functions. However, such specification may otherwise be performed using only an appropriate evaluation function to the optical recording medium 10 specified from the type of the optical recording medium 10 by reading identification information of the optical recording medium 10 recorded on the optical recording medium 10 upon starting of recording of required information on the optical recording medium 10.

The PCA can be utilized effectively to specify an appropriate intensity of laser light by performing the OPC using only an evaluation function optimum to the optical recording medium 10 in this manner.

Or, step writing may be performed always using a predetermined evaluation function irrespective of the type of the optical recording medium 10 to specify the intensity of laser light. Where only the predetermined evaluation function is always used, it is possible to facilitate control of the OPC, and the PCA can be utilized efficiently to specify an appropriate intensity of laser light.

After the specification of the intensity of laser light and the specification of an evaluation function, the control processor 15 sets the intensity of laser light to be outputted from the optical pickup section 12 to the intensity specified by the OPC and starts a recording process of required information on the optical recording medium 10 (step S6).

Before the recording process comes to an end, the control processor 15 executes the running OPC and controls the intensity of laser light based on a evaluation function specified by the running OPC. If the information to be record remains no more, then the control processor 15 ends the recording process (step S7).

On the other hand, if a predetermined timing set in advance comes during the recording process, then the control processor 15 interrupts the recording process (step S8).

In the present embodiment, when it is detected that the optical pickup section 12 moves by a predetermined dimension in a diametrical direction of the optical recording medium 10, interruption of the recording process is performed at step S8. However, such interruption of the recording process may otherwise be performed after every lapse of a predetermined period of time or in response to detection that recording of a predetermined amount of information is completed.

Or else, the interruption of the recording process may be performed in response to detection that the intensity of laser light exceeds a predetermined intensity range, which is set based on an intensity of laser light specified in advance, by intensity control of laser light by the running OPC.

By performing an interruption decision of a recoding process based on the intensity of laser light in this manner, the recording process can be interrupted only when it is decided necessary to interrupt the recording process because of abnormal intensity of the laser light. Consequently, the number of times of interruption can be reduced, and the recording processing can be performed with a higher efficiency.

It is to be noted that the intensity range to be used as a reference to the interruption decision may be any intensity range as occasion demands. Preferably, the range is set with reference to the intensity at a point of time of starting of outputting of laser light interrupted by the interruption decision.

If the timing at which the recording process is to be interrupted does not come at step S8, then the control processor 15 returns the processing to step S6 to proceed the running OPC.

If the recording process is interrupted at step S8, then the control processor 15 reproduces information recorded on the optical recording medium 10 prior to the interruption (step S9). Then, the control processor 15 calculates $\beta$ and/or asymmetry values from the reproduction signal (step S10).

Then, if it is decided at step S11 that the $\beta$ and/or asymmetry values obtained at step S10 fall within permissible ranges with respect to the $\beta$ and/or asymmetry values obtained at step S2, then the control processor 15 returns the processing to step S6 to resume the running OPC.

Figure 5:
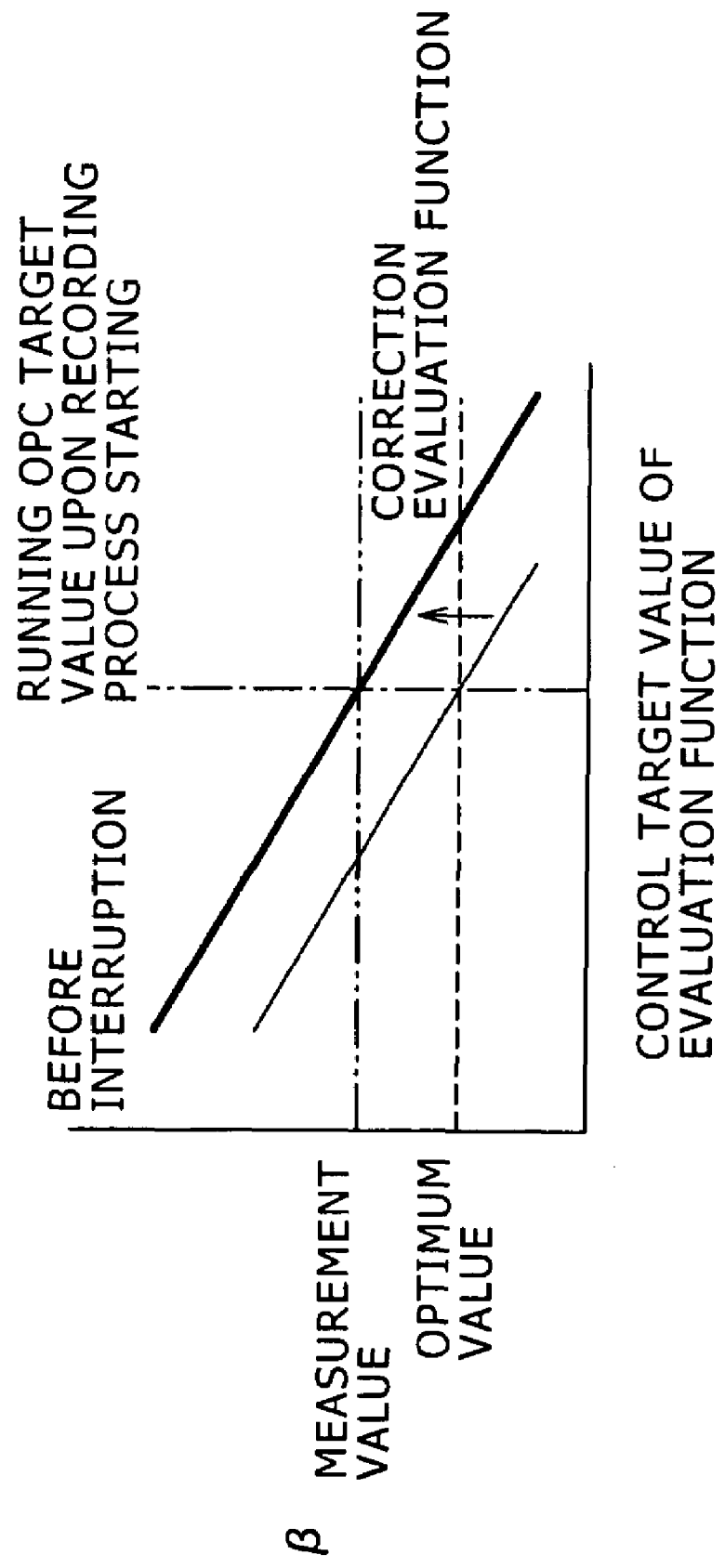
FIG. 5 is a diagram illustrating an evaluation function adjustment method where a plurality of evaluation values are used in the optical recording medium recording apparatus.

On the other hand, if it is decided at step S11 that the $\beta$ and/or asymmetry values exceed the permissible ranges, then the control processor 15 changes the evaluation function (step S12). In particular, referring to FIG. 5, the control processor 15 parallelly shifts the evaluation function used prior to the interruption so that the thus corrected evaluation function may pass an intersecting point between the running OPC target value upon starting of the recording process and the $\beta$ value calculated through measurement after the interruption.

Then, the control processor 15 selects that one of the evaluation functions stored in the memory 17 serving as a storage section which exhibits the least error from the corrected evaluation function as a new evaluation function to be used.

Then, the control processor 15 returns the processing to step S6 so that the running OPC is resumed based on the new evaluation function.

By detecting a variation of the $\beta$ and/or asymmetry values and changing the evaluation function when the variation amount of the $\beta$ and/or asymmetry values is great in this manner, the output intensity of the laser light can be adjusted using an evaluation function having the highest controllability at the recording point of time of information on the optical recording medium 10. Therefore, a stabilized recording process with high quality can be executed over the overall region of the optical recording medium 10.

Particularly since a plurality of evaluation functions are prepared in advance, even if the optical recording medium 10 has a fabrication dispersion, an appropriate recording process for the dispersion can be used.

When the recording process on the optical recording medium 10 is resumed based on a new evaluation function, the output intensity of the laser light may possibly vary suddenly and cause deterioration of the recording characteristic. Therefore, the output intensity of the laser light is changed at a slow pace.

The control processor 15 repeats the processes at the steps from step S6 to step S12 and ends the processing when it detects an end of the recording process at step S7.

Figure 6:
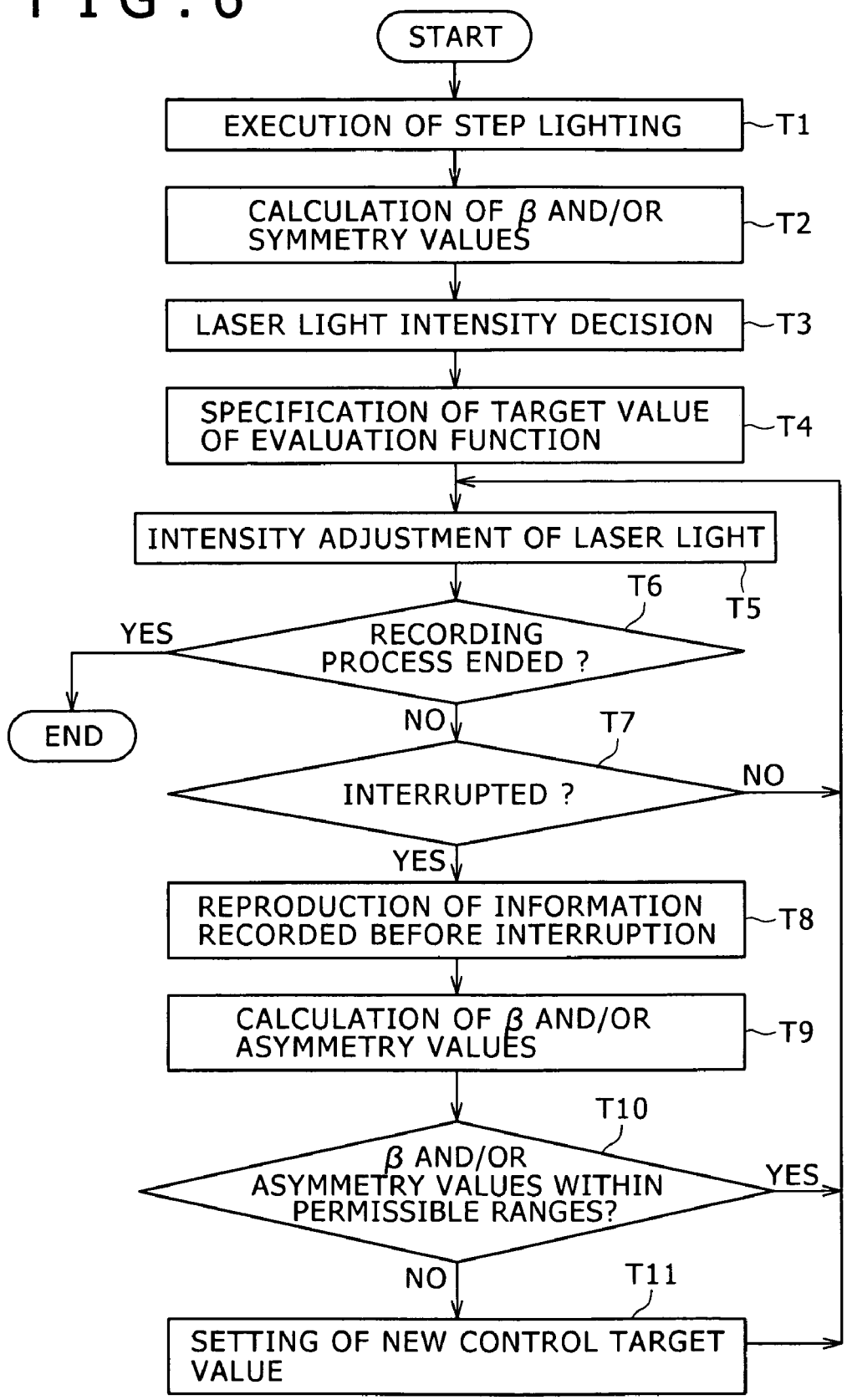
FIG. 6 is a flow chart illustrating a control procedure of the controlling processor of the optical recording medium recording circuit of the optical recording medium recording apparatus where a single evaluation function is available.

Now, a recording process of information on an optical recording medium where only one evaluation function is stored in advance in the memory 17 is described in detail with reference to FIG. 6. It is to be noted that it is assumed that interruption of the recording process is performed at a predetermined timing set in advance by the control section similarly as in the recording process described hereinabove where a plurality of evaluation functions are used.

First, the optical recording medium recording apparatus executes OPC upon starting of recording of required information on an optical recording medium by performing step writing in the PCA which is a trial writing region of the optical recording medium 10 (step T1).

After the recording process by the step writing comes to an end, the control processor 15 reproduces test data written in various conditions and calculates $\beta$ and/or asymmetry values from the reproduction signal (step T2).

The control processor 15 specifies the intensity of the laser light with which an optimum recording state is obtained from the calculated $\beta$ and/or asymmetry values (step T3). Then, the control processor 15 specifies a target value for the evaluation function with which laser light of the specified intensity can be outputted (step T4).

Thereafter, the control processor 15 sets the intensity of laser light to be outputted from the optical pickup section 12 to the intensity specified by the OPC and starts a recording process of required information on the optical recording medium 10 (step T5).

Before the recording process comes to an end, the control processor 15 executes the running OPC and controls the intensity of laser light based on the evaluation function. If the information to be record remains no more, then the control processor 15 ends the recording process (step T6).

On the other hand, the control processor 15 interrupts the recording process when a predetermined timing set in advance comes in the recording processing state (step T7).

If the timing at which the recording process is to be interrupted does not come at step T7, then the control processor 15 returns the processing to step T5 to continue the running OPC.

If the recording process is interrupted at step T7, then the control processor 15 reproduces information recorded on the optical recording medium 10 prior to the interruption (step T8). Then, the control processor 15 calculates $\beta$ and/or asymmetry values from the reproduction signal (step T9).

Then, if it is decided at step T10 that the $\beta$ and/or asymmetry values obtained at step T9 fall within permissible ranges with respect to the $\beta$ and/or asymmetry values obtained at step T2, then the control processor 15 returns the processing to step T5 to resume the running OPC.

On the other hand, if it is decided at step T10 that the $\beta$ and/or asymmetry values exceed the permissible ranges, then the control processor 15 changes the evaluation function. In particular, referring to FIG. 7, the control processor 15 parallelly shifts the evaluation function used prior to the interruption so that the thus corrected evaluation function may pass an intersecting point between the running OPC target value upon starting of the recording process and the $\beta$ value calculated through measurement after the interruption.

Then, the control processor 15 sets a corrected evaluation function with which the value of $\beta$ of the correction evaluation function becomes equal to the value obtained at step T2 as a new target value (step T11).

Then, the control processor 15 returns the processing to step T5 so that the running OPC is resumed based on the control target value of the new target value.

In this manner, where one evaluation value is prepared, a stabilized recording process with high quality can be executed over the overall region of the optical recording medium 10 by parallelly moving the evaluation function in accordance with the value of $\beta$ to adjust the control target value with which the desired $\beta$ value can be obtained.

The control processor 15 repeats the processes at the steps from step T5 to step T11 and then ends the processing when an end of the recording process is detected at step T6.

While a preferred embodiment of the present invention has been described using specific terms, such description is for illustrative purposes, and it is to be understood that changes and variations may be made without departing from the spirit or scope of the following claims.

What is claimed is:

1. An optical recording medium recording apparatus, comprising:
   an optical pickup section configured to irradiate laser light on an optical recording medium to perform recording or reproduction of information on or from the optical recording medium;
   a control section configured to control said optical pickup section; and
   a storage section configured to store in advance an evaluation function for adjusting the intensity of the laser light in response to reflected light of the laser light when information is to be recorded on the optical recording medium;
   wherein said control section being operable to interrupt a recording process of information onto the optical recording medium midway of the recording process and reproduce information recorded before the interruption and then adjust the evaluation function based on a detection result of reflected light upon the reproduction.

2. The optical recording medium recording apparatus according to claim 1, wherein a plurality of evaluation functions are stored in advance in said storage section, and said control section adjusts the evaluation function by selecting one of the evaluation values based on the detection result of the reflected light upon the reproduction.

3. The optical recording medium recording apparatus according to claim 2, wherein, before the recording process of the information on the optical recording medium is performed, said control section causes a plurality of test data to be recorded in a trial writing region provided on the optical recording medium while changing the intensity of the laser light and evaluates a recorded state using a predetermined one of the evaluation functions stored in said storage section irrespective of the type of the optical recording medium, and decides the intensity of the laser light when the recording process of the information on the optical recording medium is performed based on a detection result of reflected light upon reproduction of the test data.

4. The optical recording medium recording apparatus according to claim 2, wherein, before the recording process of the information on the optical recording medium is performed, said control section causes a plurality of test data to be recorded in a trial writing region provided on the optical recording medium while changing the intensity of the laser light and evaluates a recording state using an evaluation function corresponding to the type of the optical recording medium from among predetermined evaluation functions stored in said storage section, and decides the intensity of the laser light when the recording process of the information on the optical recording medium is performed based on a detection result of reflected light upon reproduction of the test data.

5. The optical recording medium recording apparatus according to claim 1, wherein said control section adjusts the evaluation function by producing a correction evaluation function obtained by correcting the evaluation function by means of parallel movement of the evaluation function or like means based on the detection result of the reflected light upon reproduction.

6. The optical recording medium recording apparatus according to any one of the claims 1 to 5, wherein said control section interrupts the recording process when the intensity of the laser light exceeds a predetermined range corresponding to the intensity of the laser light at a point of time at which recording of information on the optical recording medium is started by adjusting the intensity of the laser light based on the evaluation function.

* * * * *